(12) United States Patent
Janssens (10) Patent No.: US 12,092,722 B2
(45) Date of Patent: Sep. 17, 2024

(54) METHOD, SYSTEM AND COMPUTER PROGRAM PRODUCT FOR DETERMINING A POSITION RELATIVE TO A CONFINED SPACE

(71) Applicant: ROMBIT NV, Antwerp (BE)

(72) Inventor: Nico Janssens, Putte (BE)

(73) Assignee: ROMBIT NV, Antwerp (BE)

( * ) Notice: Subject to any disclaimer, the term of this patent is extended or adjusted under 35 U.S.C. 154(b) by 506 days.

(21) Appl. No.: 17/440,112

(22) PCT Filed: Mar. 20, 2020

(86) PCT No.: PCT/IB2020/052603
§ 371 (c)(1),
(2) Date: Sep. 16, 2021

(87) PCT Pub. No.: WO2020/188538
PCT Pub. Date: Sep. 24, 2020

(65) Prior Publication Data
US 2022/0196822 A1 Jun. 23, 2022

(30) Foreign Application Priority Data
Mar. 21, 2019 (BE) .................................. 2019/5174

(51) Int. Cl.
*G01S 13/46* (2006.01)
*G01S 5/00* (2006.01)
(Continued)

(52) U.S. Cl.
CPC .............. *G01S 13/46* (2013.01); *G01S 5/012* (2020.05); *G01S 5/015* (2020.05);
(Continued)

(58) Field of Classification Search
CPC .......... G01S 5/012; G01S 5/013; G01S 5/015; G01S 5/016; G01S 5/0252;
(Continued)

(56) References Cited

U.S. PATENT DOCUMENTS

| 2013/0342565 | A1  | 12/2013 | Sridhara et al. |
| 2014/0015706 | A1* | 1/2014  | Ishihara ................. G01S 13/04 342/27 |
| 2021/0393147 | A1* | 12/2021 | Kajiwara ........... G06K 7/10306 |

FOREIGN PATENT DOCUMENTS

| CN | 108112070 A | 6/2018 |
| EP | 2461176 A1 | 6/2012 |

(Continued)

OTHER PUBLICATIONS

C. Duan et al., A Non-Coherent 802.15.4a UWB Impulse Radio, 2007 IEEE International Conference on Ultra-Wideband, p. 146-151 (Year: 2007).*

(Continued)

*Primary Examiner* — Bernarr E Gregory
*Assistant Examiner* — Fred H Mull
(74) *Attorney, Agent, or Firm* — Vorys, Sater, Seymour and Pease LLP (57) ABSTRACT

The present invention relates to a method, a system and a computer program product for determining a position relative to a confined space. For this purpose, one or more UWB anchors are provided on the confined space, a distance of the UWB item relative to the one or more UWB anchors is repeatedly determined, a variability is determined based on the repeatedly determined distances and it is determined whether the UWB item is in the confined space, by comparing said variability with a predetermined variability limit value.

16 Claims, 3 Drawing Sheets

(51) Int. Cl.
  *G01S 13/02* (2006.01)
  *G08B 21/18* (2006.01)
(52) U.S. Cl.
  CPC .......... *G01S 13/0209* (2013.01); *G08B 21/18* (2013.01); *G01S 2013/466* (2013.01)
(58) Field of Classification Search
  CPC ............. G01S 5/02521; G01S 5/02527; G01S 13/0209; G01S 13/46; G08B 21/18; G08B 21/182; G08B 21/22
  See application file for complete search history.

(56) References Cited

FOREIGN PATENT DOCUMENTS

| WO | 2018068130 A1 | 4/2018 | |
|---|---|---|---|
| WO | 2020/188538 A1 | 9/2020 | |
| WO | WO-2020184260 A1 * | 9/2020 | ......... G06K 7/10306 |

OTHER PUBLICATIONS

Variance. Collins English Dictionary (12th ed.). Collins. https://search.credoreference.com/articles/Qm9va0FydGljbGU6Mzc1MTc3OA==?aid=279753 (Year: 2014).*
ISR-WO dated Jun. 3, 2020 for parent application PCT/IB2020/052603.

* cited by examiner

METHOD, SYSTEM AND COMPUTER PROGRAM PRODUCT FOR DETERMINING A POSITION RELATIVE TO A CONFINED SPACE

TECHNICAL FIELD

The invention relates to methods, systems and computer program products for determining a position relative to a confined space.

PRIOR ART

A confined space is a space that is largely or substantially completely closed or closable. Examples comprise a rainwater drain and a storage tank. Such spaces are characterised by an intrinsic hazard, for example by the presence of hazardous substances or a lack of oxygen. Because of this intrinsic hazard, it is necessary to implement safety procedures. An example of such a procedure is the detection of unauthorised persons. This procedure can be implemented, for example, by equipping persons with a device suitable for determining a position.

Such a device is known, for example, from WO 2018/068 130 and EP 2 461 176. These devices determine a location vis-à-vis a plurality of anchor receivers. However, such devices have the important disadvantage that they are not suitable for use in a confined space. After all, these spaces are characterised by a strong signal reflection that strongly influences the round-trip time (RTT) of radio signals. This makes accurate distance measurements vis-à-vis the anchor receivers very difficult.

CN 108 112 070 and US 2013 0 342 565 both describe a UWB indoor positioning system. Such systems are not suitable for indoor and outdoor use according to the present invention.

There is a need for devices that are suitable for use in confined spaces. Among other things, this can lead to a better detection of unauthorised persons.

The present invention has as an object an improved detection method that excludes at least one of the aforementioned technical disadvantages of known devices.

SUMMARY OF THE INVENTION

In a first aspect, the present invention relates to a method for determining a position of a UWB item relative to a confined space according to claim 15.

In a second aspect, the invention relates to a method for determining a position of a person relative to a confined space according to claim 1.

In a third aspect, the present invention relates to a system for determining a position of a person relative to a confined space according to claim 13.

In a fourth aspect, the present invention relates to a computer program product for determining a position of a person relative to a confined space according to claim 14.

The present invention is advantageous because the variability is used to determine whether a UWB item is in the confined space. The variability of the distance is no longer a drawback in this invention, but the technical feature that allows realisation of the invention.

DETAILED DESCRIPTION

The invention relates to a method, a system and a computer program product. The invention was summarised in the section provided for this purpose. In what follows, the invention is described in detail, and preferred embodiments are explained.

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, 'a' and 'the' refer to both the singular and the plural, unless the context presupposes otherwise. For example, 'a segment' means one or more segments.

When the term 'around' or 'about' is used in this document with a measurable quantity, a parameter, a duration or moment, and the like, then variations are meant of approx. 20% or less, preferably approx. 10% or less, more preferably approx. 5% or less, even more preferably approx. 1% or less, and even more preferably approx. 0.1% or less than and of the quoted value, insofar as such variations are applicable in the described invention. However, it must be understood that the value of a quantity used where the term 'about' or 'around' is used, is itself specifically disclosed.

The terms 'comprise', 'comprising', 'consist of', 'consisting of', 'provided with', 'have', 'having', 'include', 'including', 'contain', 'containing' are synonyms and are inclusive or open terms that indicate the presence of what follows, and which do not exclude or prevent the presence of other components, characteristics, elements, members, steps, as known from or disclosed in the prior art.

Ultra-wideband (UWB) is a term for signals that occupy a significant bandwidth relative to the centre frequency. According to the Federal Communications Commission (FCC), a UWB signal is a signal whose fractional bandwidth (the ratio of the bandwidth to the centre frequency of the signal) is greater than or equal to 0.2 or whose bandwidth is greater than or equal to 500 MHz. This bandwidth corresponds to very short pulses in the time domain and allows UWB based radar systems to obtain more accurate target information. In addition, it is also possible to design radars with an improved spatial resolution compared to conventional radar systems.

Quoting numerical intervals by endpoints comprises all integers, fractions and/or real numbers between the endpoints, these endpoints included.

In a first aspect, the invention relates to a method for determining a position of a UWB item relative to a confined space. For this purpose, one or more UWB anchors are provided on the confined space. Preferably, on the wall of the confined space. The method comprises the steps of repeatedly determining a distance from the UWB item relative to the one or more UWB anchors, determining a variability based on the repeatedly determined distances and determining whether the UWB item is in the confined space by comparing said variability with a predetermined variability limit value.

In a second aspect, the invention relates to a method for determining a position of a person relative to a confined space, according to the first aspect of the current invention. To this end, an ultra-wideband (UWB) item associated with the person is provided. One or more UWB anchors are provided on the confined space. The method comprises the steps of repeatedly determining a distance from the UWB item relative to the one or more UWB anchors, determining a variability based on the repeatedly determined distances and determining whether the UWB item is in the confined space by comparing said variability with a predetermined variability limit value.

In a third aspect, the invention relates to a system for determining a position of a person relative to a confined space. The system comprises a UWB item for the person and one or more UWB anchors for positioning on the confined space. The system is configured to repeatedly determine a distance of the UWB item relative to the one or more UWB anchors, to determine a variability based on the repeatedly determined distances of the UWB item relative to the one or more UWB anchors, and determining whether the UWB item is in the confined space based on said variability.

In a fourth aspect, the invention relates to a computer program product for determining a position of a person relative to a confined space. The computer program product comprises instructions for obtaining repeatedly determined distances of an item, preferably an UWB item, relative to one or more anchors, preferably UWB anchors; determining a variability based on the repeatedly determined distances; and determining whether the item is in the confined space by comparing said variability with a predetermined variability limit value.

A person having ordinary skill in the art will appreciate that the methods can be implemented in the computer program product and executed using the system. In what follows, the four aspects of the present invention are therefore treated together. Furthermore, each feature described above and below may relate to any of the four aspects, even if the feature is described in conjunction with a specific aspect.

The present invention aims to determine a position of a UWB item relative to a confined space. Such a confined space defines two half-spaces, inside and outside the confined space, respectively. The present invention is advantageous because the variability is used to determine whether a UWB item is in the confined space. The variability of the distance is no longer a drawback in this invention, but the technical feature that allows realisation of the invention.

Preferably, the UWB item is associated with a person. Such an association makes it possible to determine whether the person is in the confined space. Such an association also allows the distance of a person relative to the confined space to be determined outside the confined space. Preferably, a wearable device is provided. Preferably, the wearable device comprises the UWB item. Preferably, the wearable device is configured to be worn by the person. The wearable device can comprise a chain. The wearable device can comprise a badge. The portable device can comprise a wrist strap. The wearable device can comprise a personal safety item such as, for example, glasses, a helmet, a jacket, a safety shoe, and the like.

The one or more anchors can be one or more UWB anchors. Such UWB anchors can be configured to execute a positioning protocol with the UWB item. The UWB item can be a UWB transmitter. The UWB item can be a UWB receiver. Depending on the positioning protocol, such UWB anchors may behave as a receiver or such UWB anchors may behave as a transmitter and receiver. Preferably, such a positioning protocol is a time-based positioning protocol. Time-based positioning protocols estimate the distance between a UWB item and a UWB anchor by measuring the time a radio frequency signal is en route between both devices (time of flight, ToF). Preferably, the ToF is determined using a two-way-ranging (TWR) algorithm and/or a time-difference-of-arrival (TDoA) protocol. A TWR algorithm exchanges multiple packages between two or more UWB items. Each package comprises one or more timestamps. Such timestamps are used to estimate the ToF. With a TWR algorithm, both the UWB anchor and the UWB item are transmitter and receiver. With a TDoA protocol, the UWB anchor is the receiver and the UWB item is the transmitter.

Preferably, the confined space comprises a wall which is reflective to radio signals. More preferably, the confined space comprises a metallic wall. According to a preferred embodiment, the confined space is a storage tank. Such confined spaces are characterised by a poor signal transmission caused by a strong signal reflection. A strong signal reflection greatly increases the variability of distance measurements. The position of the person according to the present invention is determined based on such variability. By comparing the variability with a predetermined variability limit value, it can be determined whether a UWB item is inside or outside the confined space.

According to a preferred embodiment, the variability is based on a standard deviation of the repeatedly determined distances over a predetermined time window. According to another preferred embodiment, the variability is based on the difference of a maximum distance and a minimum distance within a predetermined time window.

In a preferred embodiment, the position of several persons relative to a confined space is determined. A UWB item is herein associated with each person. In another preferred embodiment, the position of a person relative to a plurality of confined spaces is determined, wherein one or more UWB anchors are positioned on each of the confined spaces. Such configurations allow use in an industrial setting. An example of an industrial setting is a business park.

In a preferred embodiment, it is determined that the UWB item is within the confined space if said variability is greater than a predetermined variability limit value. The variability limit value can be adjusted based on the reflective properties of the wall of the confined space. Assessing whether said variability is greater than a limit value is easy to implement.

Preferably, the confined space comprises an access opening and one or more UWB anchors are positioned on the entrance opening. Preferably, the access opening comprises an edge. Therein, one or more UWB anchors are positioned on this edge. Such positioning has the advantage that the position of a person relative to the access opening can be determined. In addition, this positioning allows the access opening to be fitted with a hatch without interfering with the operation of the UWB anchors.

More preferably, two UWB anchors are positioned at the edge of the access opening. Each UWB anchor receives signals from a subspace of one of the aforementioned half-spaces. By positioning two UWB anchors at the edge of the access opening, signals can be received from a significant part of the two half-spaces.

Even more preferably, the two UWB anchors are spaced horizontally. Horizontally spaced anchors are advantageous because they allow, in addition to a distance from the item to the anchors, an angle in the horizontal plane of the item relative to the UWB anchors to be determined.

According to an embodiment, the one or more UWB anchors can be positioned in a hatch covering the access opening. Preferably, two UWB anchors are positioned in the hatch. More preferably, these two UWB anchor are spaced horizontally.

In a preferred embodiment, a signal is output to an information technology (IT) service if said repeatedly determined distance is less than a predetermined distance limit value. By sending a signal to an IT service, it can be checked whether a person is approaching a confined space. The IT service is therefore able to take appropriate action.

In a preferred embodiment, an authorisation of the person is associated with the UWB item. In case a wearable device comprises the UWB item, an authorisation of the person may be associated with the wearable device. This authorisation is checked when the variability is greater than a predetermined variability limit value and/or when at least one distance of the repeatedly determined distances is less than a predetermined distance limit value. If the person is not properly authorised, he/she will be notified. Preferably, the person is notified by the opening of a communication link between the person and an IT service and/or the sounding of an alarm. Preferably, the communication link is opened between a microphone of an IT service and a loudspeaker. Preferably, the alarm is sounded through one or more notification media. Such notification media comprise auditory notification media such as a loudspeaker, visual notification media such as LED lighting or motion notification media such as a vibrating element. Very preferably, the alarm is sounded through auditory notification media. Most preferably, the alarm is sounded through a loudspeaker.

Such loudspeakers may be associated with a confined space or may be associated with a person. A loudspeaker associated with a confined space can be provided on, in or around this space. Preferably, such a loudspeaker is provided on, in or around a UWB anchor. A loudspeaker associated with a person can be integrated into a wearable device. The wearable device can comprise a chain. The wearable device can comprise a badge. The portable device can comprise a wrist strap. The wearable device can comprise a personal safety item such as, for example, glasses, a helmet, a jacket, a safety shoe, and the like. Most preferably, such a loudspeaker is integrated in an armband.

Notifying the person if they are not properly authorised prevents unobserved access to the confined space. The authorisation of the person is preferably related to one or more qualifications and/or training courses of the person. This has the advantage that only a person with a correct qualification and/or training has access to the confined space.

It will be appreciated that any communication technology known in the prior art can be used for a communication or signalling purpose described by the present invention. According to an embodiment of the invention, a signal is broadcast and/or a communication link is opened between a UWB item and a UWB anchor using UWB communication technology. According to a further embodiment, the UWB anchors are configured to transmit the broadcast signal and/or the communication link over the internet. By positioning the UWB anchors on the edge of the access opening, a good connection with the UWB item is guaranteed. In addition, such a configuration guarantees good internet connectivity.

According to an embodiment of the invention, different confined spaces may require different authorisations. By associating different authorisations with different spaces, each confined space is only accessible to a person with a correct qualification and/or training. This allows use in an industrial setting.

It will be appreciated that any radio-based technology characterised by a drop in a signal strength within a confined space, known in the art, can be used to determine whether or not a person is in such confined space. Preferably, such radio-based technologies are selected from a group comprising Global Positioning System (GPS), General Packet Radio Service (GPRS), Universal Mobile Telecommunications System (UMTS), Long Term Evolution (LTE) and Long Range Active (LoRA). Preferably, GPS technology is used.

In a preferred embodiment, a GPS receiver is associated with a person. For example, the wearable device can comprise both the UWB item and the GPS receiver. This GPS receiver is used to measure a GPS signal strength. This GPS signal strength is used to determine whether the person is in the confined space by comparing said variability with a predetermined variability limit value and said GPS signal strength with a predetermined GPS signal limit value. By determining whether a person is in the confined space on the basis of both said variability and said GPS signal limit value, it is possible to determine with greater certainty whether a person is in the confined space.

According to an embodiment of the invention, the position of a person can also be determined by GPS triangulation. The GPS receiver can be used for this.

According to another embodiment of the invention, the position of a person can also be determined by Wireless Fidelity (Wi-Fi) triangulation. A Wi-Fi receiver can be used for this. This Wi-Fi receiver can be associated with a person. The wearable device can comprise the Wi-Fi receiver.

In a preferred embodiment, it is determined that the person is within the confined space if said variability is greater than a predetermined variability limit value and said GPS signal strength is less than a predetermined GPS signal limit value. The variability limit value can be adjusted based on the reflective properties of the wall of the confined space. The GPS signal limit value can be adjusted based on the signal transmission of the wall of the confined space. Assessing whether said variability and GPS signal strength becomes greater or less than a limit value, respectively, is easy to implement.

In a preferred embodiment, an authorisation of a person is checked if said variability is greater than a predetermined variability limit value and/or said GPS signal strength is less than a predetermined GPS signal limit value and/or said repeatedly determined distance is less than a predetermined distance limit value. If the person is not properly authorised, he/she will be notified. Preferably, by the opening of a communication link between the person and an IT service and/or the sounding of an alarm. By assessing the authorisation on the basis of the variability and the GPS signal strength and the distance, it becomes possible to check with greater certainty whether a person is properly authorised.

In a preferred embodiment, one or more hazard sensors are associated with the person. These hazard sensors are used to measure one or more parameters. If one or more measured parameters exceed one or more predetermined limit values, the person is notified. Preferably, the person is notified by the opening of a communication link between the person and an IT service and/or the sounding of an alarm. By notifying the person if one or more parameters mentioned are exceeded, injuries can be prevented.

The term 'hazard sensor' in the present invention is intended to mean a sensor configured to measure certain 'environmental parameters' and/or 'user parameters'.

In the present invention, the term 'environmental parameter' is intended to mean a parameter associated with the environment of a person. When such 'environmental parameter' exceeds a predetermined limit value, there is a risk of injury to the person.

According to an embodiment of the invention, a hazard sensor measures one or more environmental parameters selected from the following group: a concentration of a particular gas (e.g. oxygen concentration in the ambient air), an air supply, a temperature of the environment, a humidity of the environment, a radiant heat and a light intensity.

By the term 'user parameter' in the present invention is meant a parameter associated with the health of a person. When such 'user parameter' exceeds a predetermined limit value, there is a risk of injury to the person. Such 'user parameters' can also indicate an injury already suffered.

According to an embodiment of the invention, a hazard sensor measures one or more user parameters selected from the following group: an orientation of the user, a heartbeat, a heartbeat variability, a breath and a position of the person.

According to an embodiment of the invention, the predetermined limit values are variable. Such variable limit values can, for example, depend on the location, the confined space and the time.

According to another embodiment of the invention, a person themselves can open a communication link with an IT service and/or the person themselves can sound an alarm. This has the advantage that when a person feels unwell, he/she can call for help.

According to an embodiment of the invention, the UWB item and/or the GPS receiver and/or the one or more hazard sensors and/or the Wi-Fi receiver is built into a wearable device. The wearable device can comprise a chain. The wearable device can comprise a badge. The portable device can comprise a wrist strap. The wearable device can comprise a personal safety item such as, for example, glasses, a helmet, a jacket, a safety shoe, and the like. Such a wearable device can comprise one or more items of personal protective equipment. Preferably such a wearable device is an armband.

According to a preferred embodiment of the invention, it is checked whether or not such a wearable device is worn by a person. This is preferably done by means of an ambient light sensor and/or a proximity sensor. By checking whether or not such wearable devices are worn by a person, the unnoticed access to a confined space by a person can be prevented. Such sensors can be configured on such wearable device and/or in a storage space and/or on a storage space and/or around a storage space. If an ambient light sensor registers a strongly varying light intensity, it can be concluded that such a wearable device is possibly being worn by a person. If a proximity sensor does not detect a wearable device and/or storage space, it can be concluded that such a wearable device is possibly being worn by a person.

According to a further embodiment of the invention, access to and/or use of such a wearable device is controlled by means of a biometric sensor or an access code. The term 'biometric sensor' refers to a sensor that can measure one or more unique human characteristics. Examples of such biometric sensors include a fingerprint scanner, a palmprint scanner, an iris scanner, a camera equipped with facial recognition software or a sound sensor equipped with voice recognition software. By controlling access to and/or use of a wearable device, abuse is prevented. Every wearable device is associated with a correct person with such a methodology.

According to a preferred embodiment, the invention comprises the steps of: outputting a UWB signal, preferably wherein the UWB signal is a UWB pulse; recording a signal strength of the output UWB signal, preferably wherein an amplitude of the signal strength is recorded; and determining whether the UWB item is in the confined space, by comparing a signal strength pattern of the recorded signal strength of the output UWB signal with a predetermined signal strength criterion. Preferably, wherein the UWB signal is output from the UWB item. Preferably, wherein the UWB signal is registered by said one or more UWB anchors. According to a preferred embodiment, the signal strength criterion may indicate a phase shift or time shift of the recorded signal strength, preferably the amplitude of the signal strength, relative to the output UWB signal. The step of determining whether a UWB item is located in the confined space within such a situation can then be done, for example, by comparing the phase shift and/or the time shift with a predetermined limit value relative to the output UWB signal, preferably a phase shift limit value and/or a time shift limit value. According to another preferred embodiment, said signal strength criterion may indicate an amplitude spectrum of the recorded signal strength. Determining whether a UWB item is in the confined space within such a situation can then be done by comparing the amplitude spectrum with a predetermined parameter associated with said amplitude spectrum. In light of the above, the inventors note that by combining techniques with the variability registration, the accuracy and consequently safety of the invention increases. By using multiple (redundant) techniques to determine whether or not the UWB item is in the confined space, safety is guaranteed in the event of one of these techniques failing.

According to a preferred embodiment of the invention, the repeatedly determined distances, of the UWB item relative to the one or more UWB anchors, are compared with a predetermined distance limit value. According to a further preferred embodiment, the step of determining whether the person is in the confined space is done by comparing the determined variability with a predetermined variability limit value when the repeatedly determined distances are less than the predetermined distance limit value. According to another further preferred embodiment, the step of determining whether the person is in the confined space is done by comparing the signal strength of a radio-based technology, preferably the GPS signal strength, with a predetermined signal limit value, preferably a GPS signal limit value, when the repeatedly determined distances are less than the predetermined distance limit value. According to another further preferred embodiment, the step of outputting the UWB signal occurs when the repeatedly determined distances are less than the predetermined distance limit value. In light of the above, the inventors note that interference may occur while operating the UWB system or other system based on a radio-based technology. Such interference can manifest itself in an increase in the variability of the repeatedly determined distances and/or in a decrease in a signal strength. Such a situation can generate a false positive result, i.e. the UWB item and the user can be incorrectly positioned in the confined space due to such interference. By only comparing the variability measurements, the signal strength and/or the signal strength pattern with the variability limit value, the signal limit value and/or the signal strength criterion when the UWB item is located at a certain distance from the confined space, such false positive results are prevented. As a result, the safety of the invention further increases.

DETAILED DESCRIPTION OF THE DRAWINGS

In what follows, the invention is described by way of non-limiting examples illustrating the invention, and which are not intended to and should not be interpreted as limiting the scope of the invention.

Figure 1:
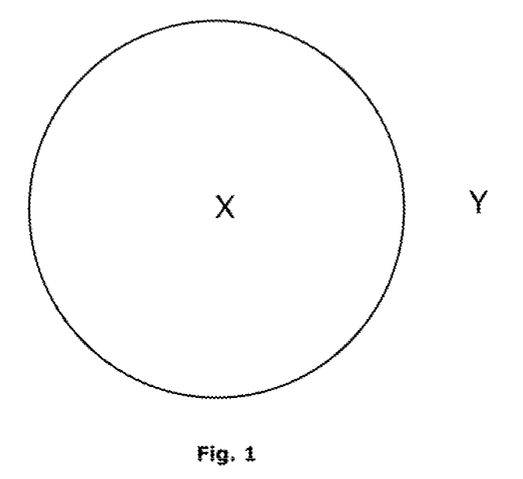
FIG. 1 shows a schematic top view of a confined space and the relative position of a UWB item with respect to this confined space.
Figure 2:
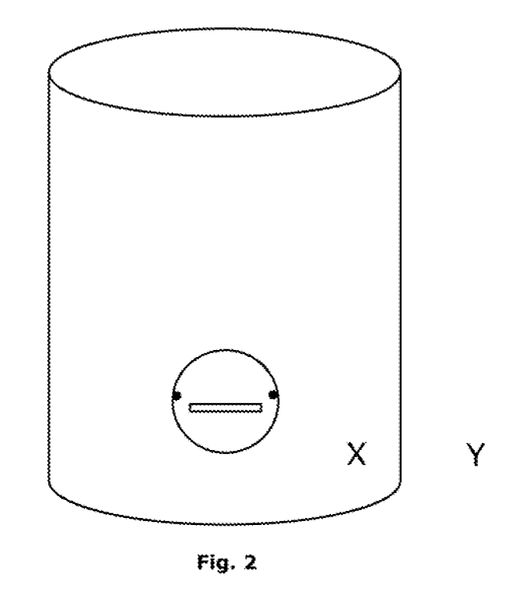
FIG. 2 shows a schematic side view of a confined space and the relative position of a UWB item relative to this confined space.

FIGS. 1 and 2 show a schematic view of the confined space. FIG. 1 shows a schematic top view of a confined space. FIG. 2 shows a schematic side view of a confined space. The relative position of the UWB item is indicated in both Figures as X and Y, inside and outside the confined space respectively. FIG. 2 also shows a schematic positioning of the UWB anchors according to a preferred embodiment. The two UWB anchors are spaced horizontally and positioned at the edge of an access opening.

Figure 3:
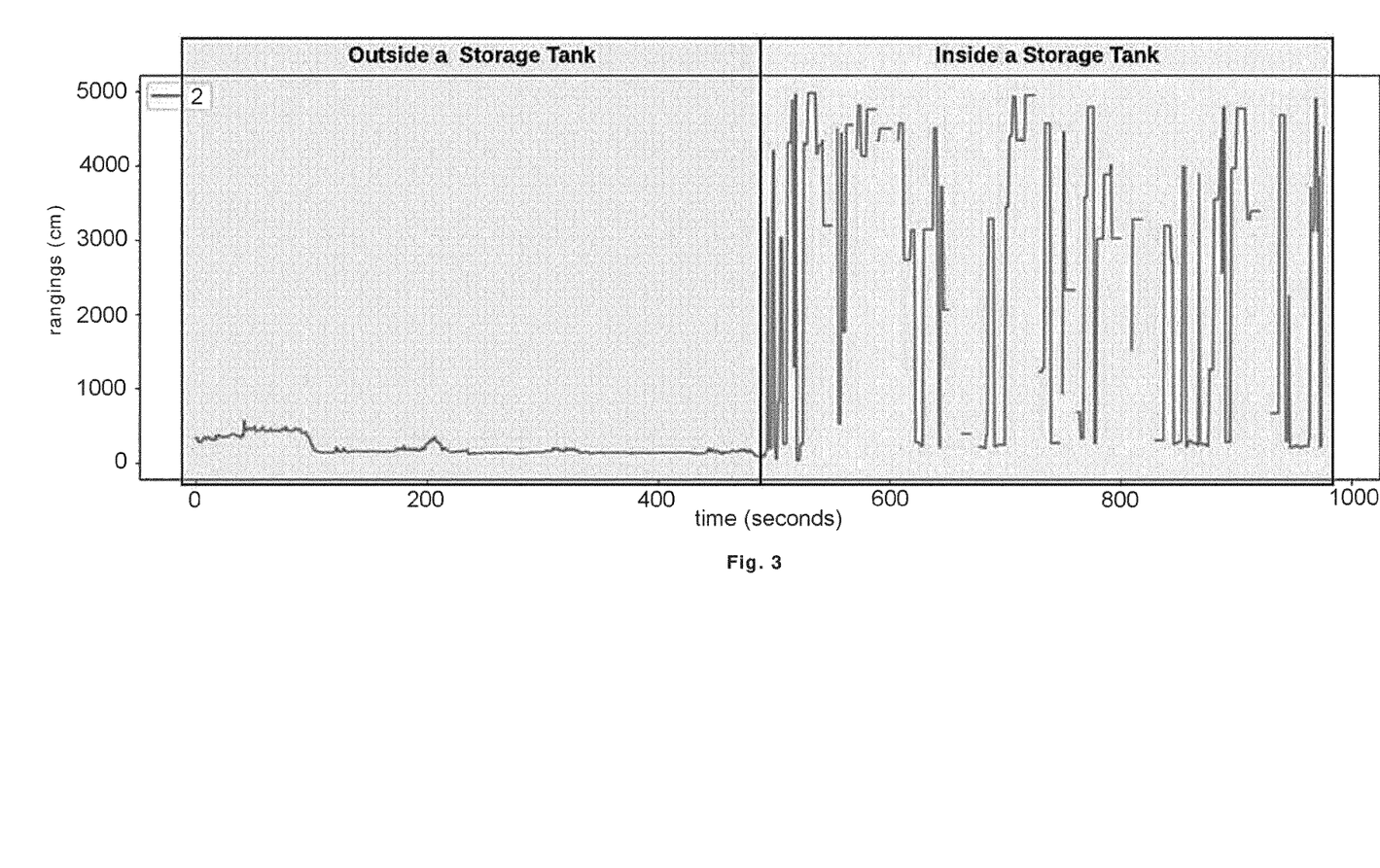
FIG. 3 shows an illustrative function of the repeated distance measurements plotted against time for a UWB item.
Figure 4:
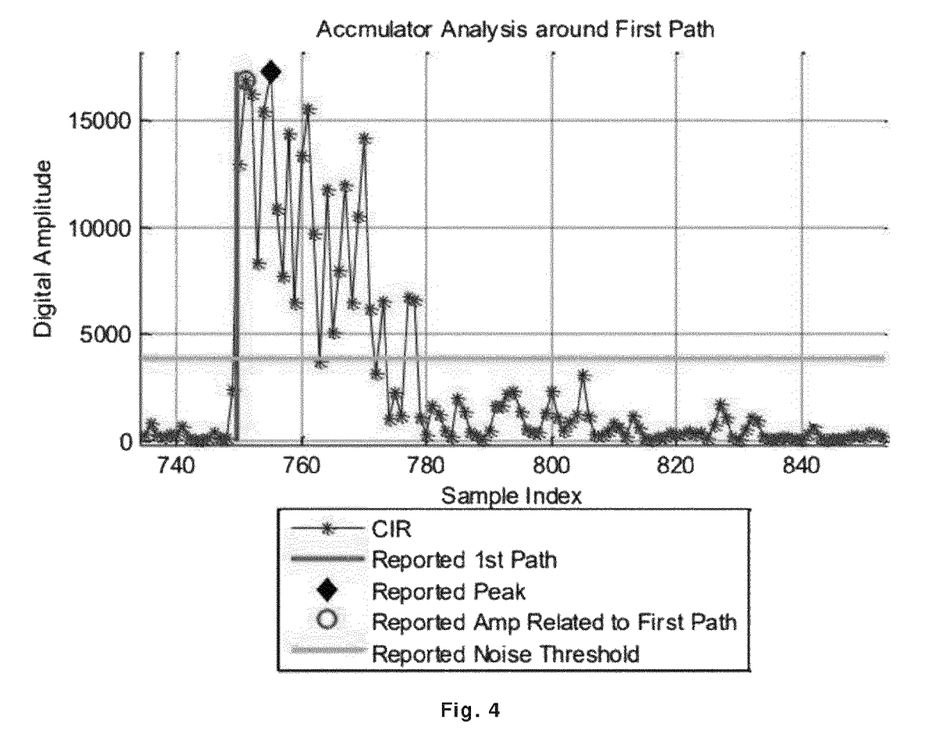
FIG. 4 shows an illustrative function of a UWB channel impulse response.

FIG. 3 shows an illustrative function of the repeated distance measurements plotted against time. The left side of FIG. 3 shows an illustrative function for a UWB item outside a confined space. The right side of FIG. 4 shows an illustrative function for a UWB item within a confined space. Due to the strong signal reflection in the confined space, a very strong variability of the repeated distance measurements is observed.

FIG. 4 shows an illustrative function of a UWB channel impulse response plotted against a sample index. Such a response can be used to determine if a UWB item is in a confined space. Similar techniques are known in the art for distinguishing line-of-sight and non-line-of-sight situations between a UWB tag and a UWB anchor. The distinction between the two situations is made by registering multipath reflection following a sent UWB impulse. The illustrative function shown in FIG. 4 shows a situation without multipath reflection. A situation where multipath reflection occurs in a confined (reflective) space may be characterised by a phase shift of the signal away from the output pulse. Consequently, it can be registered whether a UWB item is in the confined space, for example, when said phase shift exceeds a predetermined phase shift limit. Said phase shift can be expressed, for example, in FIG. 4 by a signal shift to an index between 780 and 800. Such a technique can be used separately to register whether a UWB item is in an enclosed space. Preferably, the technique is used in combination with the variability registration of the repeatedly determined distances as described herein. Such a combination further enhances the accuracy, and therefore safety, of the present invention.

As will be recognised by those skilled in the art, the innovative concepts described in the current application can be adapted and varied over a huge variety of applications. Nor is the scope of the patented concept limited by any of the examples given above.

The invention claimed is:

1. A method for determining a position of a person relative to a confined space, the method comprising the steps of:
   providing an ultra-wideband (UWB) item associated with the person;
   providing one or more UWB anchors on the confined space;
   repeatedly determining a distance of the UWB item relative to the one or more UWB anchors;
   wherein the method comprises the steps of:
   determining a variability based on the repeatedly determined distances;
   determining whether the UWB item is in the confined space, by comparing said variability with a predetermined variability limit value.

2. The method according to preceding claim 1, wherein the confined space comprises an access opening, the access opening comprising an edge, and wherein said one or more UWB anchors are positioned on the edge of the access opening.

3. The method according to preceding claim 2, wherein two UWB anchors are positioned at the edge of the access opening.

4. The method according to claim 1, wherein the confined space comprises a reflective wall.

5. The method according to claim 4, wherein the confined space is a storage tank.

6. The method according to claim 1, wherein it is determined that the UWB item is in the confined space if said variability is greater than the predetermined variability limit value.

7. The method according to claim 1, the method further comprising the step of outputting a signal to an information technology (IT) service if said repeatedly determined distance is less than a predetermined distance limit value.

8. The method according to claim 1, wherein the method further comprises the steps of:
   checking an authorisation of the person associated with the UWB item if said variability is greater than the predetermined variability limit value and/or at least one distance of said repeatedly determined distances is less than a predetermined distance limit value; and,
   notifying the person if they are not properly authorised.

9. The method according to claim 1 any of the preceding claims, wherein the method further comprises the steps of:
   providing a Global Positioning System (GPS) receiver associated with the person;
   measuring a GPS signal strength;
   determining whether the person is in the confined space by comparing said variability with the predetermined variability limit value and said GPS signal strength with a predetermined GPS signal limit value.

10. The method according to preceding claim 9, wherein the method further comprises the steps of:
    checking an authorisation of the person if said variability is greater than the predetermined variability limit value and/or said GPS signal strength is less than the predetermined GPS signal limit value and/or said repeatedly determined distance is less than a predetermined distance limit value;
    notifying the person if they are not properly authorised.

11. The method of claim 9 wherein it is determined that the person is in the confined space if said variability is greater than the predetermined variability limit value and said GPS signal strength is less than the predetermined GPS signal limit value.

12. The method according to claim 1, wherein the method further comprises the steps of:
    providing one or more hazard sensors associated with the person;
    measuring one or more parameters by means of one or more hazard sensors;
    notifying the person if said one or more measured parameters exceed one or more predetermined limit values.

13. The method according to claim 1, wherein the position of several persons relative to a confined space is determined, wherein for each person a UWB item associated with the person is provided.

14. The method according to claim 1, wherein the position of a person relative to a plurality of confined spaces is determined, and wherein one or more UWB anchors are positioned on each of the confined spaces.

15. A non-transitory computer readable medium storing computer-executable instructions for determining a position of a person relative to a confined space, which when executed on a computer system, cause said computer system to:
- obtain repeatedly determined distances of an item relative to one or more anchors;
- determine a variability based on the repeatedly determined distances;
- determine whether the item is in the confined space, by comparing said variability with a predetermined variability limit value.

16. A method for determining a position of a UWB item relative to a confined space, the method comprising the steps of:
- providing one or more UWB anchors on the confined space;
- repeatedly determining a distance of the UWB item relative to the one or more UWB anchors;
- determining a variability based on the repeatedly determined distances; determining whether the UWB item is in the confined space, by comparing said variability with a predetermined variability limit value.

* * * * *